June 7, 1966  E. LEHRER ETAL  3,254,964
APPARATUS FOR THE PRODUCTION OF ACETYLENE BY INCOMPLETE
COMBUSTION OF HYDROCARBONS
Filed Oct. 19, 1964
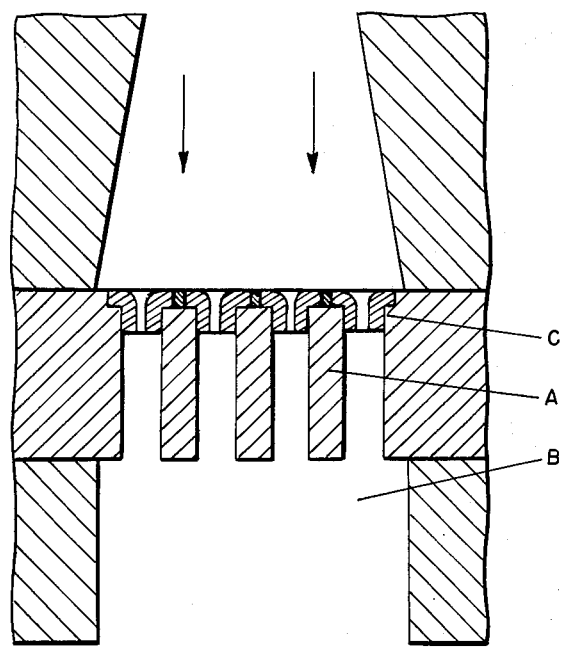
INVENTORS
ERWIN LEHRER
WALTER TELTSCHIK
ATT'YS United States Patent Office 3,254,964
Patented June 7, 1966

3,254,964
APPARATUS FOR THE PRODUCTION OF ACETYLENE BY INCOMPLETE COMBUSTION OF HYDROCARBONS
Erwin Lehrer, Bad Duerkheim, and Walter Teltschik, Frankenthal, Pfalz, Germany, assignors to Badische Anilin- & Soda-Fabrik Aktiengesellschaft, Ludwigshafen (Rhine), Germany
Filed Oct. 19, 1964, Ser. No. 406,659
Claims priority, application Germany, Oct. 5, 1960, B 59,644
3 Claims. (Cl. 23—277)

This is a continuation-in-part of application Serial No. 142,630, filed October 3, 1961, now abandoned.

It is known to produce acetylene from gaseous or vaporizable hydrocarbons by partial oxidation with oxygen, by separately preheating the hydrocarbon and the oxygen, bringing them together at the mixing point at great speed and allowing the mixture to flow from the mixing chamber through a gas distribution block into the reaction chamber where it is converted in a flame reaction into cracked gas containing acetylene.

In the known method of preparing acetylene, the initial materials light gasoline, methane and oxygen are heated up separately to temperatures between 150° and 700° C., mixed with each other in the ratio of about 1 part by volume of oxygen to 2 to 3 parts by volume of hydrocarbon, ignited and reacted at a temperature of about 1,500° C. within 3 milliseconds ($3 \times 10^{-3}$ seconds) to form acetylene and carbon monoxide. After the reaction, the hot gases are quenched and the acetylene is separated from the gas mixture.

It is also known that it is advantageous to use as the gas distributor a block through which passes a plurality of parallel tubes or channels. These channels are 120 to 200 mm. in length and 15 to 35 mm. in diameter. This gas distribution block may consist of heat-resistant material, for example of ceramic material, of heat-conducting material or of a combination of the two materials.

About 20 mm. has been considered the maximum permissible diameter of the tubes or channels in the distribution block. A larger inside diameter gives rise to various disadvantages. For example, the flame becomes unstable, or loud noises, e.g., howling, occur. It is known, however, that tubes or channels with a considerably larger cross-section, for example with diameters up to about 35 mm., can be used if the tubes or channels are shaped so that the gas streams are caused to flow spirally. Even with this embodiment, however, the instability of the flame behind the gas distribution block is not obviated.

We have found that these disadvantages in gas distributors which contain tubes or channels of large cross-section do not occur if the tubes or channels contain inserts which hinder the gas flow. The tubes or channels advantageously contain inserts which constrict their cross-section along part of their total length. In this way, not only is the yield of acetylene considerably increased but the oxygen content of the cracked gas is reduced practically to zero. It is therefore possible to use short reaction chambers, with the result that the incidence of carbon black is small. At the same time there is no longer any noise, which indicates an increased stability of the flame. The constriction of the cross-section is preferably at the side of the gas distributor where the gas stream is introduced.

The inserts may be of the same material as the gas distributor itself, for example ceramic or heat-resistant steel alloys. Steel alloys containing silicon, chromium and aluminium have proved to be especially useful for this purpose.

The cross-section of the constricted parts is advantageously 30 to 90%, especially 40 to 70%, of the cross-section of the portions of the tubes or channels without the inserts. The length of the inserts is from 5 to 20 percent that of the channels. Especially good results are achieved when transition from the narrower cross-section to the wider cross-section of the tube or channel is via a sharp edge so that additional whirling of the gas mixture takes place. The constriction of the tubes or channels at the gas inlet side may be produced in a favorable way by providing the cylindrical tubes or channels of the gas distributor with exchangeable inflow inserts. This makes it possible to select rapidly from several sets of inflow inserts those with the most favorable shape and diameter. It has also been found advantageous for the inflow inserts to be rounded at the gas inlet side. The accompanying drawing illustrates by way of example an embodiment of the arrangement according to this invention. In the drawing, A denotes the gas distributor, B the reaction chamber and C the inflow inserts.

The following example is given with reference to the accompanying drawing and further illustrates the invention, but the latter is not limited thereto.

*Example*

2,000 m.$^3$ (S.T.P.) per hour of methane is preheated to 600° C. in a preheater and 1,140 m.$^3$ (S.T.P.) per hour of oxygen is similarly preheated to a temperature of 600° C. in a second preheater. The hot gases are supplied to a mixing apparatus. After complete mixing, the mixture passes through a gas distributor consisting of parallel straight cylindrical tubes of 25 mm. in diameter and 160 mm. in length into the reaction chamber where, is a flame reaction, a cracked gas is formed which contains 8.2% by volume of acetylene and 0.35% by volume of oxygen and which entrains 4.6 g./m.$^3$ (S.T.P.) of carbon black. Periodically, loud howling occurs.

If, however, flow resistance means, for example, inflow inserts C (15 mm. in length; 18 mm. free diameter) are provided in the tubes of the gas distributor, and otherwise the same conditions as above are applied, a cracked gas is formed in the reaction chamber B which contains 8.7% by volume of acetylene and 0.07% by volume of oxygen and which entrains 3.7 g./m.$^3$ (S.T.P.) of carbon black. No noise whatever occurs.

We claim:

1. Apparatus for the production of acetylene by the incomplete combustion of hydrocarbons with oxygen in a flame reaction which comprises: a mixing chamber, a reaction chamber, a gas distributor consisting of a plurality of parallel tubes connecting said mixing chamber and said reaction chamber, and inserts within said parallel tubes defining a constricted passageway for the flow of gas from said mixing chamber to said reaction chamber, said passageway having straight parallel sides in the direction of flow, said inserts serving to constrict the cross-section of said parallel tubes for from 5 to 20% of their total length, said 5 to 20% being sufficient to stabilize the flame and to lessen substantially the noise created during the reaction, the inserts serving to constrict the passageway of said tubes to from about 30 to about 90% of the cross-section of the tubes without inserts, said tubes having a uniform cross-section apart from the area constricted by said inserts.

2. Apparatus for the production of acetylene by the incomplete combustion of hydrocarbons with oxygen in a flame reaction which comprises: a mixing chamber, a reaction chamber, a gas distributor consisting of a plurality of parallel tubes connecting said mixing chamber and said reaction chamber, and removable inserts within said parallel tubes defining a constricted passageway for the flow of gas from said mixing chamber to said reaction chamber, said passageway having straight parallel sides in the direction of flow, said removable inserts serving to constrict the cross-section of said parallel tubes for from 5 to 20% of their total length, said 5 to 20% being sufficient to stabilize the flame and to lessen substantially the noise created during the reaction, the removable inserts serving to constrict the passageway of said tubes to from about 30 to about 90% of the cross-section of the tubes without inserts, said tubes having a uniform cross-section apart from the area constricted by said inserts.

3. Apparatus as in claim 2 wherein said removable inserts are placed at the mixing chamber side of said parallel tubes, and wherein the transition from the constricted cross-section of the tubes to the full cross-section is via a sharp edge, and wherein the inserts are rounded at the mixing chamber side of said parallel tubes.

References Cited by the Examiner
UNITED STATES PATENTS

| | | | |
|---|---|---|---|
| 1,714,473 | 5/1929 | Hepburn | 158—99 |
| 2,692,819 | 10/1954 | Hasche et al. | 23—277 |
| 2,715,648 | 8/1955 | Sachsse et al. | 260—679 |

FOREIGN PATENTS 5,936   9/1912   Great Britain.

MORRIS O. WOLK, *Primary Examiner.*